March 25, 1958     H. H. RAWSON     2,827,933
SPACING CONTROL MECHANISM FOR TRIM SAWS
Filed Jan. 30, 1953     9 Sheets-Sheet 2

FIG. 4.

INVENTOR.
HARRY H. RAWSON
BY
ATTY

March 25, 1958  H. H. RAWSON  2,827,933
SPACING CONTROL MECHANISM FOR TRIM SAWS
Filed Jan. 30, 1953  9 Sheets-Sheet 4

INVENTOR.
HARRY H. RAWSON
BY
ATTY.

March 25, 1958        H. H. RAWSON        2,827,933
SPACING CONTROL MECHANISM FOR TRIM SAWS
Filed Jan. 30, 1953        9 Sheets-Sheet 7

INVENTOR.
HARRY H. RAWSON
BY
ATTY.

March 25, 1958 — H. H. RAWSON — 2,827,933
SPACING CONTROL MECHANISM FOR TRIM SAWS
Filed Jan. 30, 1953 — 9 Sheets-Sheet 9

INVENTOR.
HARRY H. RAWSON

United States Patent Office 2,827,933
Patented Mar. 25, 1958

2,827,933

SPACING CONTROL MECHANISM FOR TRIM SAWS

Harry H. Rawson, Spokane, Wash.

Application January 30, 1953, Serial No. 334,299

10 Claims. (Cl. 143—37)

The present invention relates to improvements in spacing control mechanism for trim saws.

In the present day sawing of lumber the customary demand is for the boards to be of standard lengths with square ends. It is the practice therefore to provide trim saws which take the lumber as it comes from the sawing and edging operation and cut it to the best practicable length. In general lumber is cut to lengths of even feet, that is, 8 feet, 10 feet, etc. long. It is a great convenience to the customer buying lumber, if when he buys a 12 foot board, the board is exactly 12 feet long and has both ends square.

Trimmers are now available on the market with two saws and cross conveyors to trim the ends of the boards. The operator has mechanism before him to adjust the saws toward and away from each other in order to get the most available length out of a piece of lumber with a standard dimension. The saws may both be movable or one may be movable with respect to the other. The control in general use today is a hand crank turned by the operator. Such a control is subject to possible inaccuracy of the operator and requires considerable physical effort. The possible inaccuracy of the operator can cause serious losses. For example, if he cuts a board that is supposed to be 12 feet long, a half inch or an inch too short by setting the saws too close together, the board will be thrown out on inspection and will have to be sold for the next lower dimension in length, resulting in the loss of almost 2 feet in length.

It is the purpose of my invention to provide a control mechanism for the spacing of the trim saws wherein the saws are moved toward and away from each other by power rather than by the physical labor of the operator and the setting of the saws at the several distances apart is predetermined so that it will be accurate without any exercise of judgment on the part of the operator.

It is also a purpose of my invention to provide a manually controlled power operated device for variably setting the trim saws at stations a predetermined distance apart wherein the drive member for moving one or both of the saws is normally locked in position and means are provided for moving it in opposite directions to bring the saws closer together or farther apart upon the simple operation of a selector. The selector is so arranged that within the limits of spacing that the trim saw frame provides, the operator can make a selection of the next desired spacing and whether it be two feet or more from the previous spacing, the saws will be automatically moved to the selected spacing and stopped.

More specifically it is the purpose of the present invention to provide a power means for adjusting the trim saws to the proper distances apart in combination with a control mechanism operable to select one of a number of predetermined spacings of the trim saws and connect the power mechanism to the trim saw moving means until the saws are positioned at the selected spacing and then to release the power means from the trim saw moving means and lock the trim saw moving means against further movement until a further selection has been made.

The detailed objects and advantages of the invention will appear more fully from the following description and the accompanying drawings which illustrate a preferred embodiment of the invention and the manner of its operation. It should be understood however, that the drawings and description are illustrative only and are not intended to limit the invention except insofar as it is limited by the claims.

Figure 1:
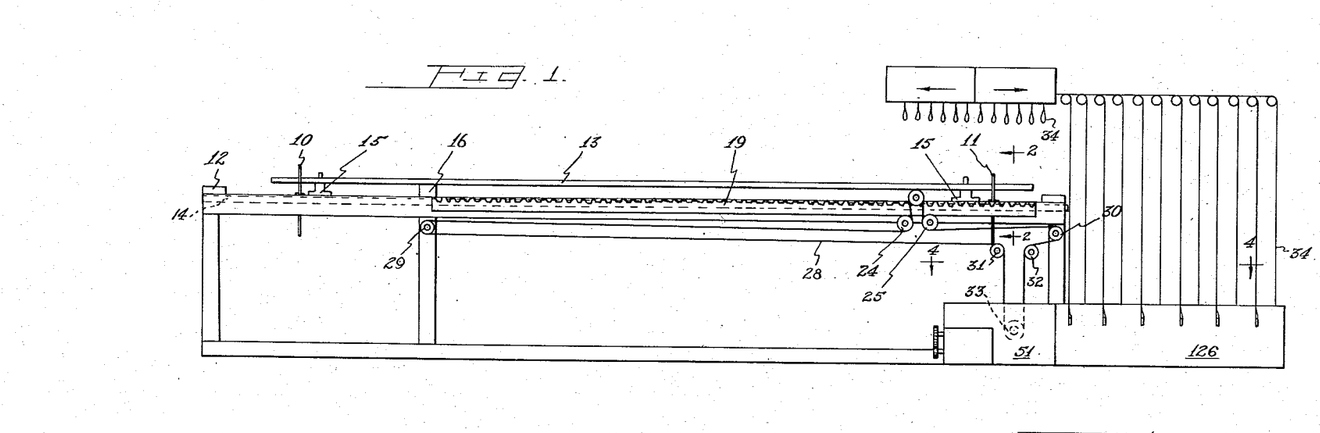
Figure 1 is a somewhat diagrammatic view in side elevation of a two saw trimmer to which my invention is applied.
Figure 2:
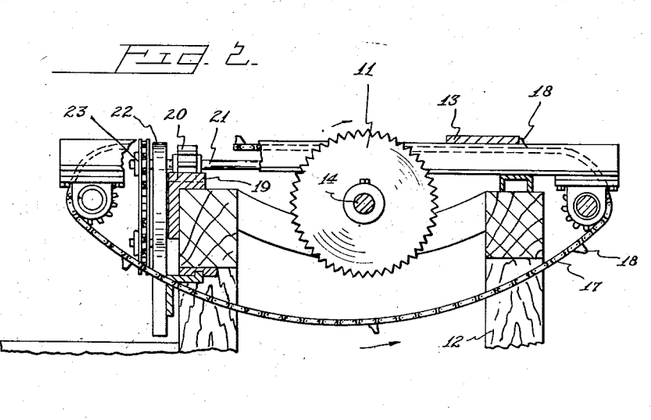
Figure 2 is an enlarged cross sectional view through the trimmer taken substantially on the line 2—2 of Figure 1.

Referring now in particular to Figures 1 and 2, my invention is shown as applied to a well known form of trimmer that is used to trim the ends of boards. In this trimmer, two circular saws 10 and 11 are mounted on a frame 12 to trim the ends of the board 13 as it is moved transversely to the frame 12. The power means for operating the saws is not shown, since it forms no part of the present invention. A shaft 14 is provided for the saws.

The board 13 is supported on spaced cross members 15 and 16 of the frame 12. There are two of the cross members 15, one adjacent each saw while the cross member 16 is an intermediate support. Power driven chains 17 are provided in each of the supports 15 for moving the board 13 across the saws. These chains have pusher blocks 18 thereon.

Adjustment of the saws toward and away from each other is accomplished in the present instance by a rack 19 on the frame 12 and a pinion 20 which is carried by a shaft 21. The pinion 20 and the shaft 21 are connected to the cross member 15 and the saw 11 is also connected to this cross member so as to move lengthwise of the frame 12 as the pinion 20 is rotated to move along the rack 19. It will be appreciated of course, that both saws 10 and 11 and their associated frames 15 could be moved toward and away from each other in accordance with well known practice.

Figure 3:
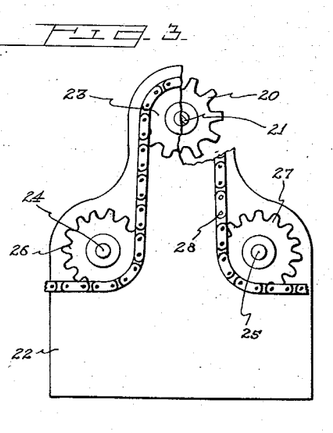
Figure 3 is an enlarged detailed view of the connection of the drive member to the trimmer operating shaft.

My invention concerns itself with the means for rotating the shaft 21 to change the distance between the saws 10 and 11. The shaft 21, as shown by Figure 2, is extended through a sliding block 22 where it has a sprocket wheel 23 mounted thereon. The block 22 has two stub shafts 24 and 25 (Fig. 3) thereon for mounting two guide sprocket wheels 26 and 27. A sprocket chain 28 is trained over the sprocket wheel 23 and under the sprocket wheels 26 and 27. The chain 28 then goes around two end sprocket wheels 29 and 30 (Fig. 1) on the frame 12 and passes over two sprocket wheels 31 and 32 and downward around a sprocket wheel 33. The sprocket wheel 33 is power driven, under control of the mechanism which will now be described, so as to impart to the chain 28 and the shaft 21 the movement necessary to change the position of the saw 11 with respect to the saw 10 the desired amount.

It is customary in the lumber trade to furnish the boards in different lengths which vary from each other by an amount of 2 feet. This of course, is merely arbitrary as the boards may vary in length in the amount of 1 foot or any desired amount. In the ordinary saw mill, the boards are sawed and edged and then delivered to the trim saws. The operator receives the board and places it on the supports 15 and adjusts the saws 10 and 11 to the proper distance apart to obtain the greatest standard length from the board. In some instances one end of the board may be beveled, due to the manner in which the tree was cut, and the other end may have a defect such as a strip of bark. The operator finds it necessary to change the spacing of the saws 10 and 11 at frequent intervals in order to get the maximum of good lumber out of the boards as they are received from the edger. With the mechanism to be hereinafter described, the only move necessary for the operator to adjust spacing of the saws to the desired amount is to locate and pull a desired control member 34. The present control mechanism is shown as adapted for varying the distance between the saws 10 and 11 from 6 feet apart to 20 feet apart. There are fourteen of the members 34 (Fig. 1). Seven members are required to obtain 2 feet increases in the distance between the saws from 6 feet up to 20 feet. Likewise seven members are required to get 2 feet decreases in the distance between the saws from 20 feet down to 6 feet.

Figure 4:
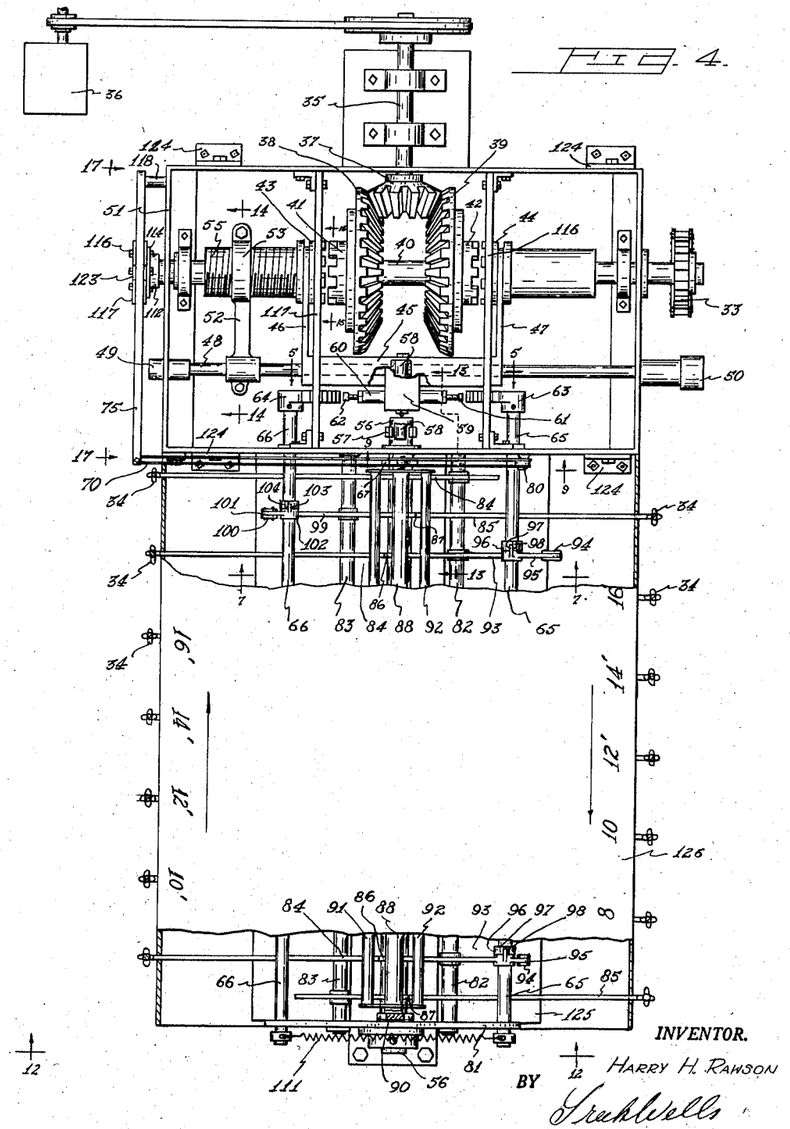
Figure 4 is a plan view of the trim saw moving mechanism and control, looking down on Figure 1 at substantially the line 4—4.

Referring now to Figure 4, the several members 34 are shown at the sides of the figure as a plurality of cords. The cover is marked to indicate the board length to which each member will adjust the saws. For example, if the operator wishes to increase the distance between the saws, and the existing distance is 14 feet, he operates the member at the desired number for the new distance, for example 16 feet, and marked by an arrow that points toward the maximum distance. The control mechanism is so constructed that if the operator pulled the other 16 foot cord, nothing would happen because that cord is only effective to reduce the distance between the saws. The cords 34 are extended overhead to a station convenient to the position the operator takes for feeding the boards to the saws.

Figure 14:
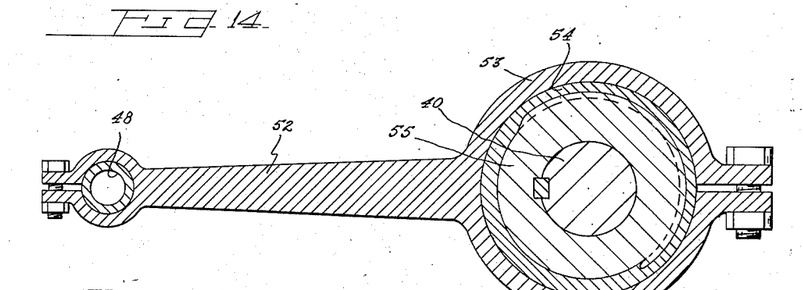
Figure 14 is an enlarged sectional view taken on the line 14—14 of Figure 4.
Figure 15:
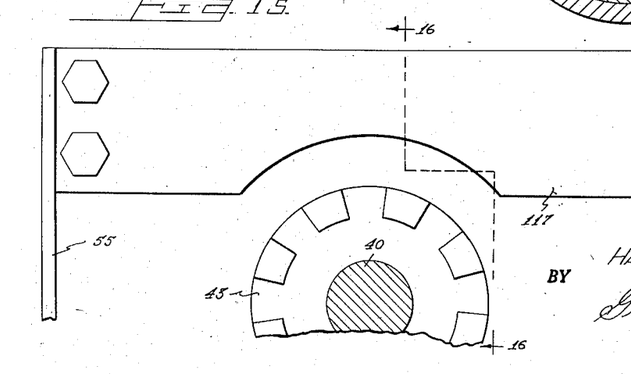
Figure 15 is an enlarged fragmentary sectional view taken on the line 15—15 of Figure 4.
Figure 16:
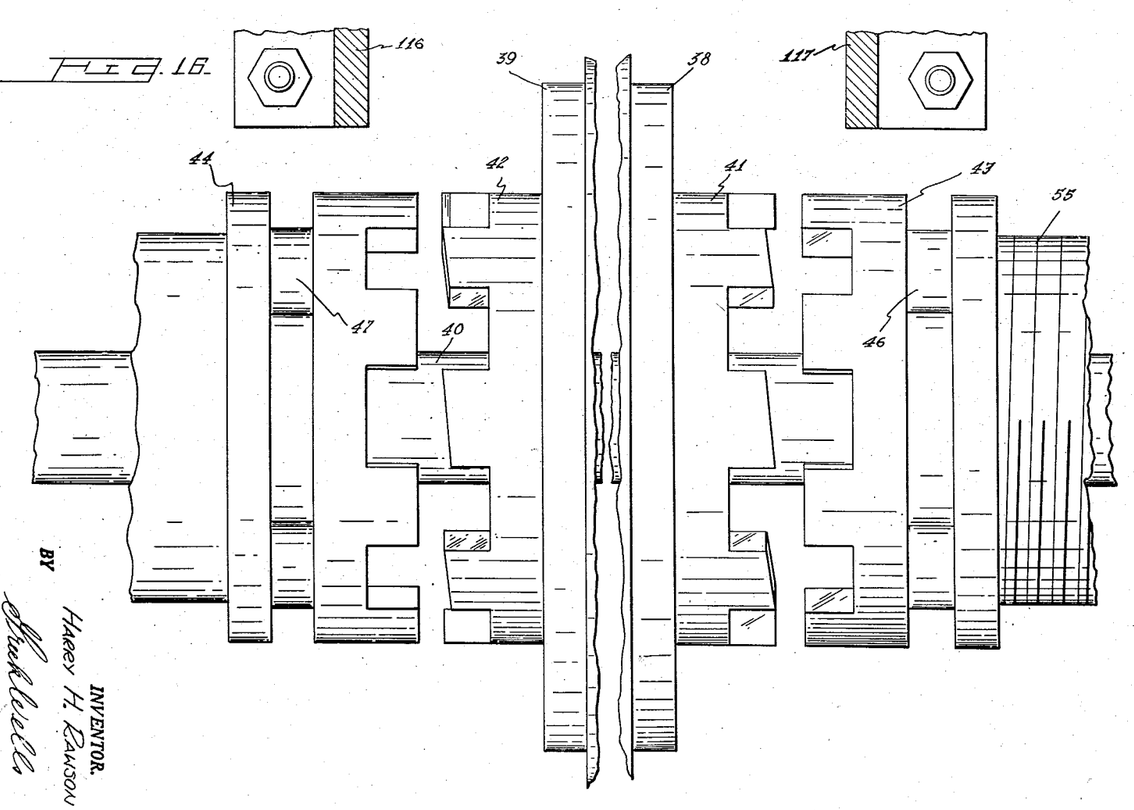
Figure 16 is a sectional view taken on the line 16—16 of Figure 15.

The mechanism by which the cords 34 control the rotation of the sprocket wheel 33 will now be described. Referring again to Figure 4, a power shaft 35 is operated from any suitable source of power such as a motor 36 which may also supply the motive power for the saws 10 and 11. The shaft 35 carries a beveled pinion 37 which is in mesh with two beveled gears 38 and 39 that are rotatably mounted on a shaft 40. The shaft 40 also mounts the sprocket wheel 33. The gears 38 and 39 have clutch members 41 and 42 integral therewith for connection to clutch rings 43 and 44 respectively. The clutch rings 43 and 44 are splined to the shaft 40 so as to rotate therewith. They, however, are slidable lengthwise of the shaft 40. A yoke 45 has arms 46 and 47 engaging the clutch rings 43 and 44 respectively so as to shift the rings to the right or left to bring one or the other of the rings into engagement with the clutch member of the corresponding gear 38 or 39. It is evident that if the clutch ring 43 is moved into engagement with the clutch member 41 on the gear 38, the shaft 40 and the sprocket wheel 33 will be driven in one direction, while if the clutch ring 44 is brought into mesh with the clutch member 42 or the gear 39, the shaft 40 and the sprocket wheel 33 will be driven in the opposite direction. A guide rod 48 can move endwise in bearings 49 and 50 provided in the housing 51 for the drive mechanism. A drive arm 52 is fixed to the rod 48 and has a split band 53 that encircles the shaft 40. The split band 53 has a threaded ring 54 therein (see Figure 14) and the clutch ring 43 has a threaded sleeve 55 thereon. Thus it will be apparent that if either of the clutch rings 43 or 44 is connected to its corresponding gear 38 or 39, the shaft 40 will be rotated, and since the sleeve 55 is slidable but not rotatable on the shaft 40 (the sleeve 55 being connected to clutch ring 43 which is splined to shaft 40) the sleeve 55 will be rotated and such rotation will cause the arm 52 to move along the sleeve. The direction of movement of the arm 52 will depend upon the direction of rotation of the sleeve 55.

Figures 5, 6:
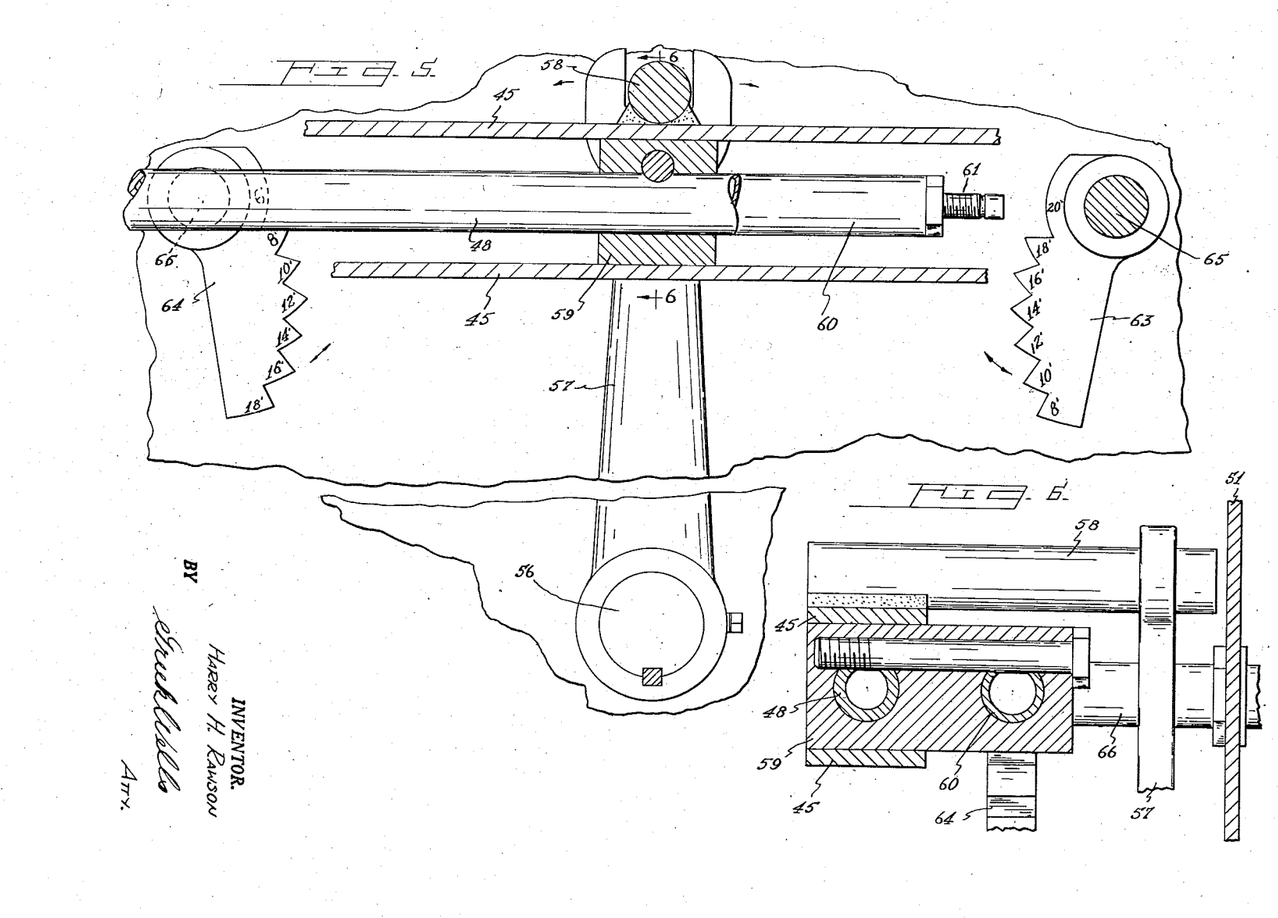
Figure 5 is an enlarged fragmentary sectional view taken on the line 5—5 of Figure 4.
Figure 6 is a sectional view taken on the line 6—6 of Figure 5.
Figure 13:
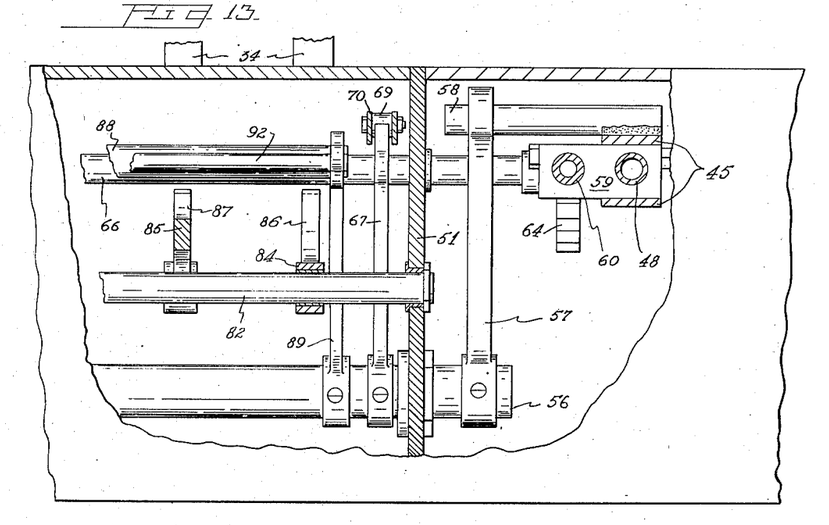
Figure 13 is an enlarged fragmentary sectional view taken on the line 13—13 of Figure 4.

The yoke 45 is moved to the right or the left for engagement of the clutch rings 43 and 44 with their respective clutch members by a rock shaft 56 (see Figures 4, 5 and 13). The rock shaft 56 has an upstanding arm 57 fixed thereto. The arm 57 is bifurcated at its upper end to receive a bar 58 that is welded to the yoke 45. The rock shaft 56 is adapted to be rocked by any one of the members 34, in a manner to be described later herein.

The rod 48 is fixed to a block 59 that is slidable lengthwise in the base of the yoke 45 (see Figures 5 and 6). The block 59 also carries a stop pin supporting rod 60. The supporting rod 60 has stop pins 61 and 62 (Fig. 4) adjustably mounted in the opposite ends thereof in position to engage adjustable stop members 63 and 64 that are secured on shafts 65 and 66. The shaft 65 is connected to the members 34 on the left in Figure 4. The saw settings are designated on the cover by the length markings and the arrows pointing toward the higher numbers. The shaft 66 is connected to the members 34 on the right in Figure 4. Cover markings on Figure 4 indicate the saw settings for these members.

It will be appreciated that since the stop pin support 60 and the rod 48 are both fixed to the block 59, if the rod 48 moves endwise far enough, it will move the stop pin in the support 60 against one of the shoulders on the corresponding member 63 or 64. When this happens the engaged clutch ring 43 or 44 is moved toward disengagement because the sleeve 55 must then slide lengthwise on the shaft 40. The yoke 45 will be moved toward center position and the rock shaft 56 will likewise be rocked back toward upright position. Releasing the clutch members in this way is, however, too slow for accurate control. I have therefore provided means whereby a very slight and predetermined movement of the rock shaft 56 toward clutch disengagement position will bring into play a snap over mechanism for quickly returning the rock shaft to upright position and thereby moving the yoke 45 and the clutch members 43 and 44 to the neutral position shown in Figure 4.

The snap over mechanism is illustrated best in Figures 4, 9, 10 and 17. The rock shaft 56 has a second lever arm 67 thereon. The lever arm 67 has a central V-shaped cam surface 68 at its upper end to receive a cam roller 69 on a spring pulled arm 70. The cam surface 68 terminates at its upper ends in sharp corners indicated at 71.

and 72, there being outwardly directed cam faces 73 and 74 also terminating at the corners 71 and 72. The arm 70 is made of two spaced plates to receive the roller 69 therebetween. The arm 70 is pivoted at 80 on the housing 51, and extends over the lever 67 and past the edge of the housing 51 to a connection with another rocker arm 75. A spring 76 is connected from this point to a lower corner of the housing 51. The spring 76 keeps a constant downward pressure on the arms 70 and 75. The points 71 and 72 on the cam 68 are positioned so that a very slight rotation of the sleeve 55, after one of the stops 61 or 62 is engaged with the corresponding member 63 or 64, will move the yoke 45 far enough to rock the shaft 56 and bring the roller 69 inside the point 71 or 72. When this happens the force of the spring 76 against the arm 70 quickly moves the roller 69 down to the center of the cam 68, rocking the shaft 56 to neutral position. Of course the arm 57 acts on the bar 58 to bring the yoke 45 to neutral position almost instantaneously.

Figure 7:
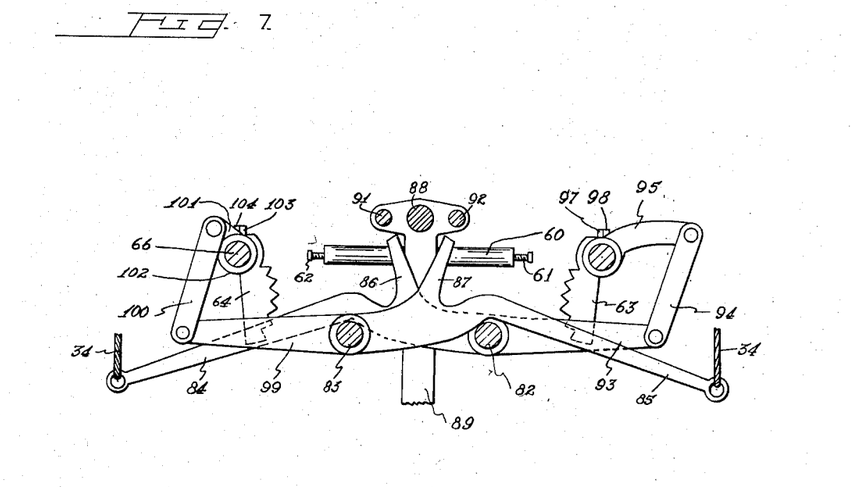
Figure 7 is a sectional view on an enlarged scale taken on the line 7—7 of Figure 4.
Figure 8:
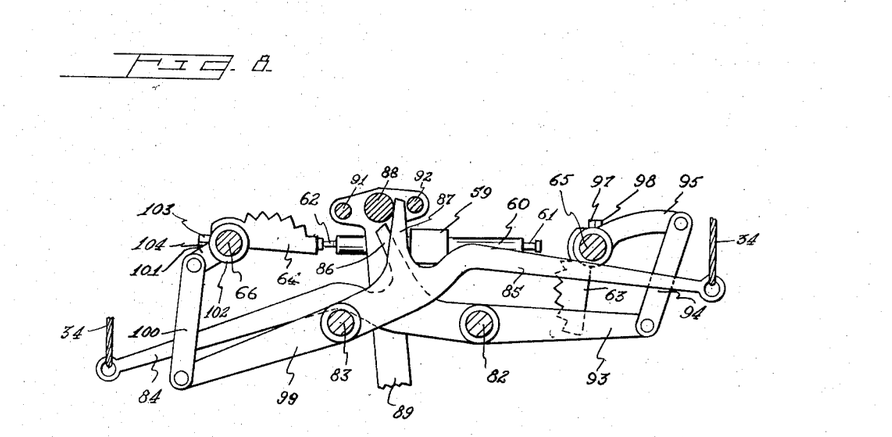
Figure 8 is a view like Figure 7 but showing the parts in a changed position.
Figure 9:
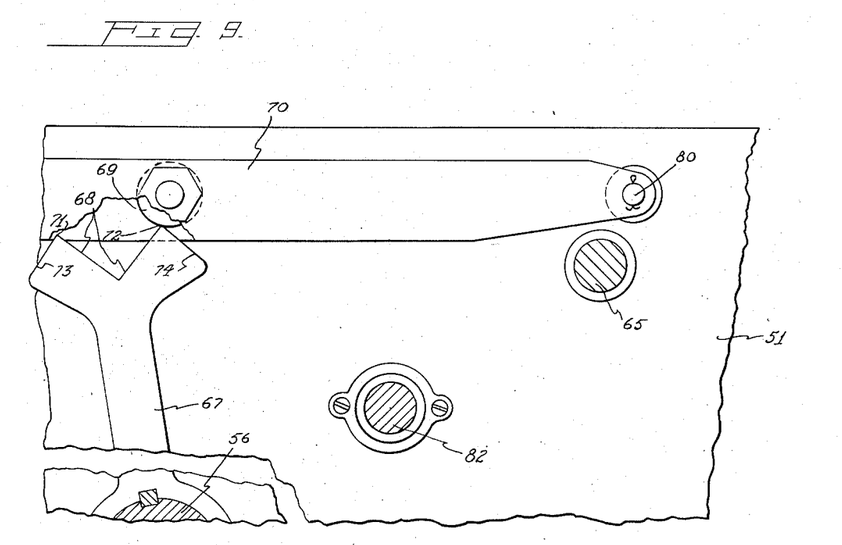
Figure 9 is a sectional view taken on the line 9—9 of Figure 4.
Figure 10:
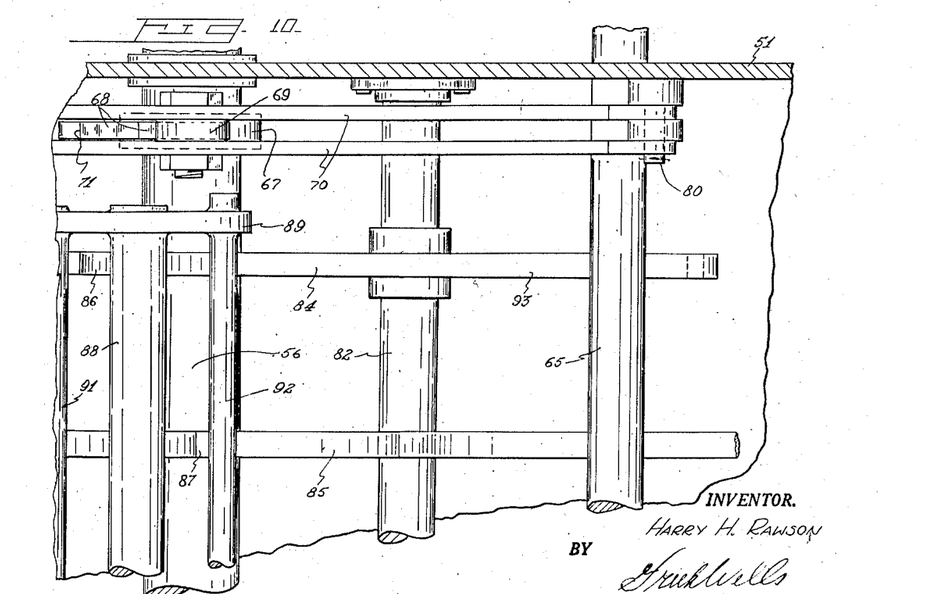
Figure 10 is a plan view of the mechanism shown in Figure 9.
Figure 11:
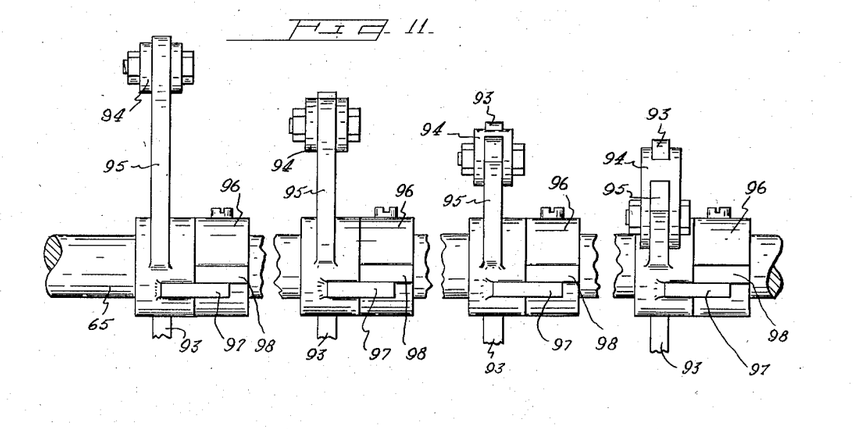
Figure 11 is a fragmentary detailed view illustrating the connection of certain of the control elements to a rock shaft.
Figure 12:
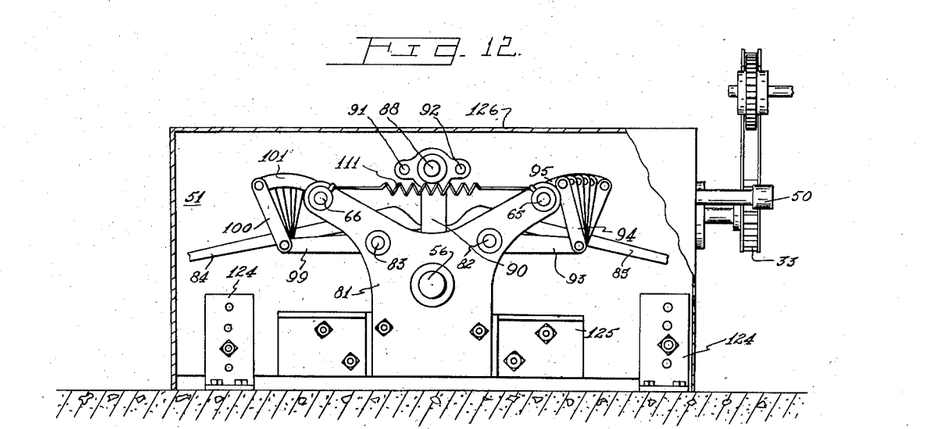
Figure 12 is an end view of the mechanism shown in Figure 4, looking in the direction of the arrows 12—12 at the lower end of Figure 4.

The manner in which the members 34 operate to rock the shaft 56 out of its neutral position will be best understood by reference to Figures 7 and 8, which are taken on the section line 7—7 of Figure 4, and by reference to Figure 12. One end of the shaft 56 is journalled in the housing 51 and the other end thereof is journalled in a standard 81. The standard 81 also provides bearings for the shafts 65 and 66. Two rods 82 and 83 connect the standard 81 to the housing 51 and these rods serve to mount a plurality of selecting levers 84 and 85. The selecting levers 84 and 85 have cam arms 86 and 87 which are adapted to engage a center rod 88 that is carried by two arms 89 and 90 which are fixed on the shaft 56. The arms 89 and 90 also carry two rods 91 and 92 on opposite sides of the rod 88. The levers 84 and 85 are pivoted on the rods 82 and 83. The selecting levers 84 are extended beyond the shaft 82 as indicated at 93 and are connected by links 94 to the free ends of arms 95 that are journalled on the shaft 65. There are collars 96 fixed on the shaft 65 alongside each of the arms 95 (see Figure 11). The arms 95 and the collars 96 have cooperating lugs 97 and 98 thereon so that if one of the levers 95 is turned by the link 94, its lug 97 will engage the lug 98 on the associated collar and rotate the shaft 65 without disturbing the other levers 95 and the links and cam levers connected thereto.

The selecting levers 85 are connected to the shaft 66 by extensions 99, links 100, arms 101 and collars 102. The collars 102 are fixed on the shaft 66 and have lugs 104 which are engaged by lugs 103 on the arms 101. Thus the shaft 66 is operated by the levers 85 in the same manner as shaft 66 is operated by the levers 84. It will be noted from Figures 11 and 12 in particular, that the several arms 95 and 101 differ in length in order that the different levers 84—85 may effect different movements of their respective shafts 65—66 for the proper positioning of the stop members 63 and 64. Each lever 84 is connected to one of the cords 34 which is shown at the left in Figures 4, 7, 8 and 12. Each of the levers 85 is connected in a corresponding manner to one of the cords 34 that is shown at the right in Figures 4, 7, 8 and 12. The selecting levers 84 therefore are to be operated to increase the spacing between the trim saws 10 and 11 while the selecting levers 85 are to be operated to decrease the spacing of the saws 10 and 11. If the operator wishes to increase the spacing of the saws, he pulls the desired cord 34 that is located on the left hand side as viewed in Figures 4 and 12. If he desires to decrease the spacing of the saws, he pulls one of the cords 34 that is on the right hand side in Figures 4 and 12. The operation following the action of the operator is automatic. It is evident that, if the stop pin 62 is engaged with the 6 foot shoulder on the stop member 64, and the stop member 63 on the shaft 65 is to be set to move the spacing of the saws from 6 feet to 8 feet, the corresponding lever 84 must move the shaft 65 through a much greater angular distance than would be necessary if the 18 foot shoulder on the stop member 63 were to be brought into position to engage the stop pin 61. Therefore the arm 95, which is connected to the lever 84 at the 8 foot adjustment of the saws is the shortest lever and the lever 84 at the 20 foot saw adjustment needs no connection whatsoever to the shaft 65, since the 20 foot shoulder on the stop member 63 is always in position when the member 63 is in rest position. It is also evident therefore that the longest arm 101 will be connected to the lever 85 which controls the shortening of the spacing of the saws to 8 feet and the lever 85 for the 6 foot adjustment will not need to be connected to the shaft 66.

The operation of any particular one of the members 34 will first cause its lever 84 or 85 to move the corresponding cam arm 86 or 87 against the center rod 88, as shown in Figure 8, and by pressing on this rod, the cam arm 86 or 87 will rock the shaft 56 to the right or the left. This rocking action is communicated through the arm 57 and the bar 58 to the clutch yoke 45 and the clutch yoke 45 is moved into position to engage one of the clutch members 43 or 44 with the corresponding clutch part 41 or 42 on the rotating gears 38 and 39. In the same action the lever 84 or 85 rocks the shaft 65 or the shaft 66 to bring the desired face on the stop member 63 or 64 into position to be engaged by the stop pin 61 or 62. Immediately upon engagement of the clutch parts, the shaft 40 is started and rotates to drive the sprocket wheel 33 and effect adjustment of the saws through operation of the sprocket chain 28. The rotation of the shaft 40 will also turn the screw threaded sleeve 55 and move the arm 52 lengthwise of the sleeve. This causes the rod 48, the block 50, and the stop pin support 60 to move in a direction to bring one of the stop pins 61—62 against the shoulder of the corresponding stop member 63—64.

When the shaft 56 was rocked to engage the clutch members, it also set the trip mechanism for returning the shaft 56 to neutral position by moving the arm 67 on the shaft 56 beneath the cam roller 69 so as to bring the cam roller over one of the points 71—72 of the cam 68. When the stop pin strikes the pre-set stop member, the movement of the block 59 and the rod 48 ceases, but the shaft 40 continues to rotate and turns the screw 55 enough to move the yoke 45, the bar 58, the arm 57, the shaft 56 and the arm 67, to bring the cam roller 69 onto the cam surface 68. The pressure being applied by the spring 76 to the arm 70, causes the roller 69 to move to the bottom of the cam 68 and thus bring the shaft 56 to neutral position with the arms 67 and 57 upright. Of course this brings the yoke 45 to neutral position with both clutch rings 43 and 44 disengaged. The actuated selecting lever 84 or 85 is pushed back by the rod 88 and, with aid of a spring 111 (see Figure 12), the actuated selecting lever is returned to resting position as shown in Figure 7. The force of the spring 111 is communicated through the shaft 65 or 66, the collar 96 or 102 and the arm 95 or 101, to the cam lever to return the cam lever and its corresponding member 34 to neutral position.

It might be possible for the shaft 40 to overrun more in the event of longer travel of the saw adjustment than in the event of a short travel adjustment. In order to avoid any difficulty from this standpoint, the ratio of movement of the saws toward and away from each other to the rotations of the shaft 40 is made such that a specific number of turns of the shaft 40 will change the distances between the saws the minimum amount. In the case shown, this minimum amount is 2 feet, and three revolutions of the shaft 40 is necessary for changing the spacing of the saws 2 feet.

Overrunning is prevented by providing a stop mechanism on one end of the shaft 40. This mechanism may be best seen in Figures 4, 17 and 19. On the end of the shaft 40 opposite the pinion 33, I provide a collar 112 which is held against rotation by set screws 113. The collar 112 has a circular upstanding flange 114 formed on its outside end. The flange 114 has three slots 115 formed therein to adjustably receive bolts 116 which hold a disk 117 against the face of the flange 114. When the disk is in place, it rotates concentrically with the shaft 40. The rocker arm 75 lies above the disk 114 and parallel to the plane of the disk. It is pivoted at one end to a shaft 118 which is supported by the housing 51. The rocker arm 75 is connected at its opposite end to the arm 70 through a yoke 119 and set screws 120 and 121. Directly above the disk 117, a depending finger 122 is formed on the arm 75.

Figure 17:
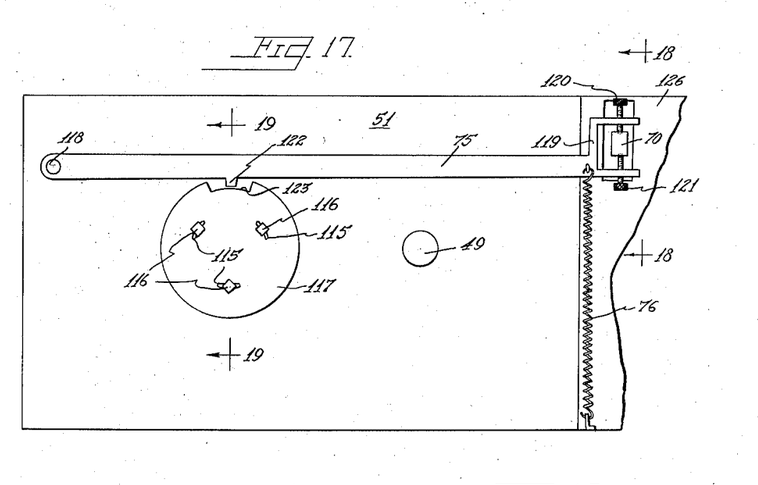
Figure 17 is an enlarged partial side view of the machine, taken on the line 17—17 of Figure 4.
Figure 18:
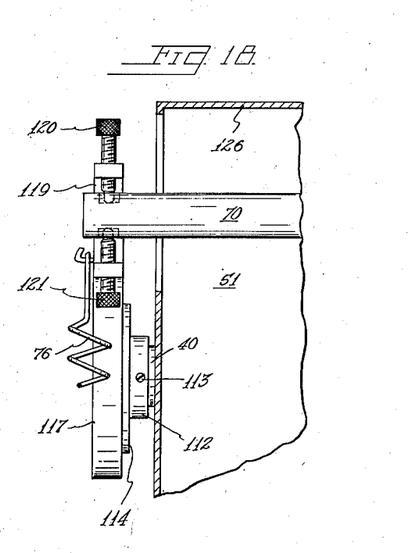
Figure 18 is a fragmentary sectional view on the line 18—18 of Figure 17.
Figure 19:
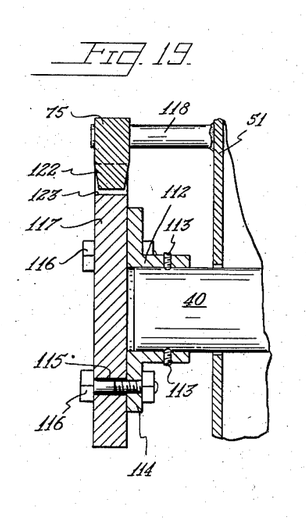
Figure 19 is an enlarged fragmentary sectional view taken on the line 19—19 of Figure 17.

When one of the stop pins 61 or 62 strikes one of the stop members 63 or 64 and rocks the arm 67 to bring the cam roller 69 onto the cam surface 68 as hereinbefore described, the arm 70 is pulled down by the spring 76, bringing the arm 67 to a neutral position and disengaging one of the clutches 43 or 44. As the spring pulls the arm 70 down, it also pulls the arm 75 down and inserts the finger 122 into a shouldered recess 123 which is formed on the periphery of the disk 117. As the shaft 40 continues to run, one of the shoulders of the recess 123 comes into contact with the finger 122 and stops further rotation of the shaft 40. In assembling the overrun mechanism, the disk 117 is adjusted so that its recess will always be at the top at the instant the clutches disengage. This adjustment is made by moving the bolts 116 in the slots 115 in the flanged portion of the collar 112. By changing the respective positions of the set screws 120 and 121, the arm 75 may be positioned so that when held up by the arm 70, the depending finger 122 clears the disk 117 and yet engages the shoulders of the recess 123 when pulled down by the spring 76.

The purpose of the rods 91 and 92 which are spaced on opposite sides of the rod 88 (Figs. 7, 8 and 12) is to hold the levers 84 and 85 in actuated position during the time that the shaft 40 is being rotated and until the stop pin 61 or 62 on the support 60 is moved into engagement with one of the shoulders on the stop member 63 or 64. As shown best in Figure 8, the cam arm 87 moves up between the rods 88 and 92 when the lever 85 is actuated. As soon as the operator releases the member 34, the lever 85 will tend to return to resting position, but if it does so, the stop member 64 will drop down to resting position too. The spring 111 is so connected to the shafts 65 and 66 that it tends to turn these shafts to bring the stop members 63 and 64 to resting position illustrated in Figure 7. This would also tend to push the lever 85 back to neutral position. However, the rod 92 serves as a stop against the cam arm 87 to prevent the return of the lever 85 to resting position until the shaft 56 is rocked back to neutral position. In a like manner the rod 91 cooperates with the cam arm 86 to prevent return of the lever 84 and the stop member 63 controlled thereby, to neutral position until the shaft 56 is returned to neutral position.

The housing 51 is carried on supports 124 (Fig. 12) that have several apertures for adjusting and leveling the housing 51. A base plate 125 is bolted to the housing 51 and the standard 81 is secured to the base plate 125. The several selecting levers 84 and 85 and the associated parts are protected by a cover 126. The indications shown in Figure 4 on the top of the cover 126, are of such size and color as to be clearly visible in order to guide proper connections of the cord members 34.

It is believed that the nature and advantages of my invention will be clear from the foregoing description and the accompanying drawings.

Having thus described my invention, I claim:

1. A manually controlled power operated means for variably setting trim saws at stations of predetermined distances apart, comprising a drive member operable to move the saws toward and away from each other, a continuously operating power driven shaft, means for temporarily connecting the shaft to the drive member to cause the drive member to bring the saws closer together, means for temporarily connecting the shaft to the drive member to cause the drive member to bring the saws farther apart, a manually operable selector for each of said connecting means including a plurality of manually operable individual selecting members each corresponding to one of the stations of operation of the saws, and means connected to the drive member and the selectors operable in response to the rotation of the drive member by said shaft by actuation of a selecting member to effect release of the drive member from the shaft when the drive member has positioned the saws at the selected station.

2. A manually controlled power operated means for variably setting trim saws at stations of predetermined distances apart, comprising a drive member operable to move the saws toward and away from each other, a continuously operating power driven shaft, a second shaft operatively connected to the drive member, two clutch members rotatably mounted on the second shaft, means connecting the clutch members to the power driven shaft to rotate in opposite directions, a complementary clutch member slidably and non-rotatably mounted on the second shaft adjacent to each of said first named clutch members, means to engage the clutch members selectively to rotate the second shaft in either direction, a plurality of manually operable selectors each corresponding to one of the stations of operation of the saws for operating the clutch engaging means, means controlled by each selector operable to effect separation of the clutch members when the second shaft has been rotated sufficiently to move the saws to the selected spacing, and means to lock the second shaft against rotation upon release of said clutch members.

3. A manually controlled power operated means for variably setting trim saws at stations of predetermined distances apart, comprising a drive member operable to move the saws toward and away from each other, a continuously operating power driven shaft, a second shaft operatively connected to the drive member to move the saws from one station to another by rotating a certain number of turns, two clutch members rotatably mounted on the second shaft, means connecting the clutch members to the power driven shaft to rotate in opposite directions, a complementary clutch member slidably and non-rotatably mounted on the second shaft adjacent to each of said first named clutch members, a rock shaft connected to said complementary clutch members and operable selectively to engage the clutch members and thereby cause rotation of the second shaft in a desired direction, a plurality of manually operable levers each corresponding to one of the stations of operation of the saws operably connected to the rock shaft, and means controlled by each lever operable by rotation of said second shaft to effect separation of the clutch members after the second shaft has made the number of turns necessary to adjust the saws to the selected spacing.

4. A manually controlled power operated means for variably setting trim saws at stations of predetermined distances apart, comprising a drive member operable to move the saws toward and away from each other, a continuously operating power driven shaft, a second shaft operatively connected to the drive member to move the saws from one station to another by rotating a certain number of turns, two clutch members rotatably mounted on the second shaft, means connecting the clutch members to the power driven shaft to rotate in opposite directions, a complementary clutch member slidably and non-rotatably mounted on the second shaft adjacent to each of said first named clutch members, a rock shaft connected to said complementary clutch members and operable selectively to engage the clutch members and thereby cause rotation of the second shaft in a desired direction, manually operable selecting levers for operating the rock shaft, a threaded member fixed to one of the complementary clutch members and slidable on the second shaft, an arm having a threaded ring on said threaded member, a reciprocable member to which said arm is connected, and stops for said reciprocable member corresponding to the spacings of said saws, said stops each being movable, by actuation of a corresponding selecting lever, into the path of said reciprocable member.

5. A manually controlled power operated means for variably setting trim saws at stations of predetermined distances apart, comprising a drive member operable to move the saws toward and away from each other, a continuously operating power driven shaft, a second shaft operatively connected to the drive member to move the saws from one station to another by rotating a certain number of turns, two clutch members rotatably mounted on the second shaft, means connecting the clutch members to the power driven shaft to rotate in opposite directions, a complementary clutch member slidably and non-rotatably mounted on the second shaft adjacent to each of said first named clutch members, a rock shaft connected to said complementary clutch members and operable selectively to engage the clutch members and thereby cause rotation of the second shaft in a desired direction, manually operable selecting levers for operating the rock shaft, a threaded member fixed to one of the complementary clutch members and slidable on the second shaft, an arm having a threaded ring on said threaded member, a rod fixed to said arm and mounted for reciprocable movement, a stop pin fixed to said rod, and a stop moved by each selecting lever, when operated, into the path of said stop pin to hold the rod and arm and thereby move the threaded member lengthwise of the second shaft toward clutch releasing position.

6. A manually controlled power operated means for variably setting trim saws at stations of predetermined distances apart, comprising a drive member operable to move the saws toward and away from each other, a continuously operating power driven shaft, a second shaft operatively connected to the drive member, two clutch members rotatably mounted on the second shaft, means connecting the clutch members to the power driven shaft to rotate in opposite directions, a complementary clutch member slidably and non-rotatably mounted on the second shaft adjacent to each of said first named clutch members, a rock shaft operable selectively to engage the clutch members and thereby cause rotation of the second shaft in a desired direction, manually operable selecting levers for operating the rock shaft, a threaded member fixed to one of the complementary clutch members and slidable on the second shaft, an arm having a threaded ring on said threaded member, a rod fixed to said arm and mounted for reciprocable movement, a stop pin fixed to said rod, a stop moved by each selecting lever, when operated, into the path of said stop pin to hold the rod and arm and thereby move the threaded member lengthwise of the second shaft toward clutch releasing position, a spring pressed cam roller riding on said rock shaft, said rock shaft having a cam surface cooperating with said roller to force the rock shaft from operating position to clutch release position upon the aforesaid movement of the threaded member.

7. A manually controlled power operated means for variably setting trim saws at stations of predetermined distances apart, comprising a drive member operable to move the saws toward and away from each other, a continuously operating power driven shaft, a second shaft operatively connected to the drive member to move the saws from one station to another by rotating a certain number of turns, two clutch members rotatably mounted on the second shaft, means connecting the clutch members to the power driven shaft to rotate in opposite directions, a complementary clutch member slidably and non-rotatably mounted on the second shaft adjacent to each of said first named clutch members, a rock shaft connected to said complementary clutch members and movable in opposite directions from a central position holding both complementary clutch members out of engagement with their respective rotating clutch members, a spring loaded cam and roller mechanism operable to move said rock shaft to central position from clutch engaging position, selecting levers individual to each of said stations and connected to the rock shaft for moving the rock shaft from central position beyond the range of said cam and roller mechanism and means controlled by each lever operable by rotation of said second shaft to return the rock shaft to the range of said cam and roller mechanism when the second shaft has made the number of turns necessary to adjust the saws to the selected spacing.

8. A manually controlled power operated means for variably setting trim saws at stations of predetermined distances apart, comprising a drive member operable to move the saws toward and away from each other, a continuously operating power driven shaft, a second shaft operatively connected to the drive member to move the saws from one station to another by rotating a certain number of turns, two clutch members rotatably mounted on the second shaft, means connecting the clutch members to the power driven shaft to rotate in opposite directions, a complementary clutch member slidably and non-rotatably mounted on the second shaft adjacent to each of said first named clutch members, a rock shaft connected to said complementary clutch members and movable in opposite directions from a central position holding both complementary clutch members out of engagement with their respective rotating clutch members, a spring loaded cam and roller mechanism operable to move said rock shaft to central position from clutch engaging position, selecting levers for moving the rock shaft from central position beyond the range of said cam and roller mechanism and means controlled by each lever operable to return the rock shaft to the range of said cam and roller mechanism when the second shaft has made the number of turns necessary to adjust the saws to the selected spacing, said last named means comprising a threaded member fixed to one of the complementary clutch members and slidable on the second shaft, an arm having a threaded ring on said threaded member, a reciprocable member to which said arm is connected, and stops for said reciprocable member corresponding to the spacings of said saws, said stops each being movable, by actuation of a corresponding selecting lever, into the path of said reciprocable member.

9. A manually controlled power operated means for variably setting a trim saw at different operating stations, comprising a drive member operable to move the saw to and fro, a continuously operating power driven shaft, clutch means for temporarily connecting the shaft to the drive member to cause the drive member to move the saw in one direction, clutch means for temporarily connecting the shaft to the drive member to cause the drive member to move the saw in the opposite direction, a manually operable selector for each of said clutch means including a plurality of individual selecting members each corresponding to one of the stations of operation of the saw, and means connected to the drive member and to the selectors operated by the rotation of the drive member selected by actuation of a selecting member to effect release of the drive member from the shaft when the drive member has positioned the saw at the selected station.

10. A manually controlled power operated means for variably setting a trim saw at different stations of operation comprising, a drive member operable to move the saw to and fro, a continuously operating power driven shaft, a second shaft operatively connected to the drive member and operable to move the saw from one station to another by rotating a certain number of complete turns, two clutch members rotatably mounted on the second shaft, means connecting the clutch members to the power driven shaft to rotate in opposite directions, a complementary clutch member slidably and non-rotatably mounted on the second shaft adjacent to each of said first named clutch members, a rock shaft connected to said complementary clutch members and operable selectively to engage the clutch members and thereby cause rotation of the second shaft in a desired direction, manually operable levers corresponding to the stations of operation of the saw operably connected to the rock shaft, and means controlled by each lever operable to effect separation of the clutch members after the second shaft has made the number of complete turns necessary to adjust the saw to the selected station.

References Cited in the file of this patent

UNITED STATES PATENTS

| | | |
|---|---|---|
| 1,761,096 | Tower | June 3, 1930 |
| 1,788,574 | Hagmaier et al. | Jan. 13, 1931 |

FOREIGN PATENTS

| | | |
|---|---|---|
| 203,498 | Switzerland | June 1, 1939 |